J. M. DODGE.
CHAIN LINK.
APPLICATION FILED FEB. 15, 1909.
973,922.
Patented Oct. 25, 1910.
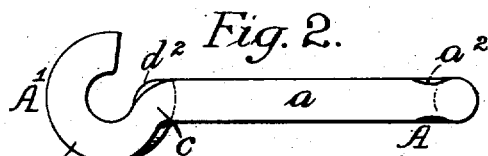
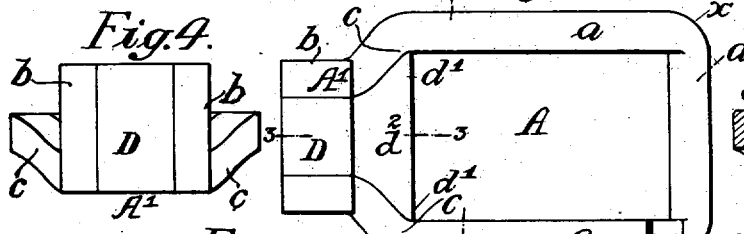
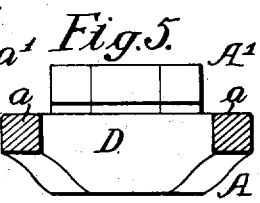
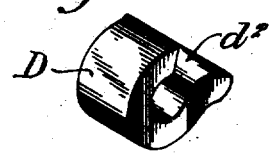
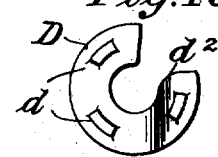
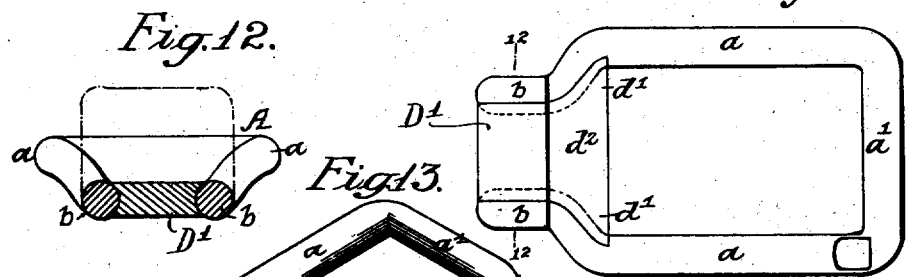
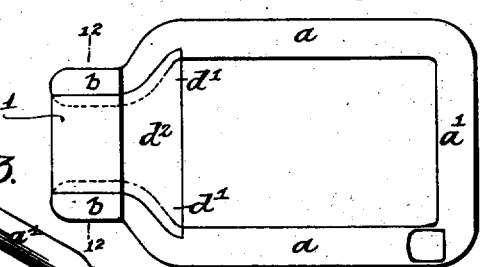
Witnesses.
Inventor.
James M. Dodge.
by his Attorneys.
THE NORRIS PETERS CO., WASHINGTON, D. C.

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

973,922.  Specification of Letters Patent.  Patented Oct. 25, 1910.

Application filed February 15, 1909. Serial No. 477,837.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to that class of detachable chain links having a bar at one end and a hook at the opposite end adapted to engage a bar of an adjoining link; the link being open at the center to receive the teeth of the sprocket wheel.

The object of my invention is to readily and accurately manufacture such a link of wrought metal, so that the body portion can be made of a rod bent into proper shape, and the hook member can be made by shaping and pressing a blank, the two parts being welded together preferably by the electric welding process.

In the accompanying drawing: Figure 1, is a plan view of my improved chain link; Fig. 2, is a side view; Fig. 3, is a longitudinal sectional view on the line 3—3, Fig. 1; Fig. 4, is an end view; Fig. 5, is a transverse sectional view on the line 5—5, Fig. 1; Fig. 6, is a perspective view of the bent rod forming the body portion of the link; Fig. 7, is a perspective view of the socket member; Fig. 8, is a view of the blank from which the hook member is made; Figs. 9 and 10, are views of the hook member having welding projections; Fig. 11, is a view showing a link made of a round rod or wire; Fig. 12, is a sectional view on the line 12—12, Fig. 11; Fig. 13, is a view showing the link made of a round bar having the hooked ends flattened, and Fig. 14, is a sectional view of a link made of a round rod having the ends of the hook flattened.

A is the body of the link having side bars $a$ $a$, an end bar $a'$ and a hooked portion A'. This is commonly known as the "Ewart" link. One of the side bars is preferably reduced at $a^2$ so that by a lateral movement one link can be readily detached from or coupled to another link.

Usually links of this type have been made of malleable iron, but I have found that a much more substantial link can be made of wrought metal bent up and pressed into shape and secured by welding.

The rod from which the body portion of the link is made, is bent at $x$ $x$ to form the end bar $a'$, and the side bars $a$ $a$, and the ends of the rod are bent so as to form hooks $b$ $b$ which aline with the socket member D. This member is mounted between the two hooked ends of the rod, as shown in Fig. 1, and welded thereto by electric welding, or by any other suitable process. The welding may extend the full length of the contacting portions of the member D, or the member D may be made as shown in Figs. 9 and 10, with projections $d$ which abut against the inner surface of the hooked ends $b$ $b$, so that the two parts can be welded together by what is known as "spot welding."

A portion $d^2$ of the socket member is at the back of the socket and projects slightly above the side bars of the link in the present instance, and reduces the slot in the socket member so as to prevent the accidental displacement of the cross bar of the adjoining link. By this arrangement a sharp bend in the side bar is avoided, producing a much stronger link.

The portion $d^2$ of the socket member has lateral extensions $d'$ bearing against the shoulders $c$ formed by bending the side bars $a$ $a$, so as to form the hook, as the hooked portion is less in width than the body of the link to enable it to engage the end bar of an adjoining link. These extended portions of the member D increase the bearing surface for the sprocket which projects through the opening in the link.

In the main figures of the drawing the rod from which the link is made is rectangular in cross section. In Figs. 11 and 12 I have shown the body portion of the link made from a round rod or wire, and I preferably in this instance, so shape the end walls of the block D' as to conform somewhat to the rounded surface of the hooked portions of the side bars. The ends of the hooked portion may be flattened as in Fig. 14, if desired.

In some cases, as shown in Fig. 13, the body portion of the link may be made of round wire and the hooked ends flattened so as to provide a suitable surface to fit against the surface of the socket member.

The shape of the bar from which the link is made will depend materially upon the size of the link and the character of work to which the link is subjected.

The socket member D illustrated in the drawing is preferably made from a blank (Fig. 8) cut into proper form, with the lateral extensions and first bent into approximate form and then compressed in suitable dies into final shape, so as to produce a suitable bearing for the cross bar of an adjoining link, and at the same time form an increased bearing surface for the sprocket, as illustrated in Figs. 9 and 10. In this process of forming the socket member I may form the projections at the ends of the socket member, as shown in Figs. 9 and 10, without adding materially to the cost when it is desired to use the "spot welding" process.

I do not claim broadly in this application the forming of loops on the ends of the side members of the link, mounting a socket bar to aline with the looped portions, and welding the parts together, as this forms the subject of a separate application for patent filed by me on March 12th, 1908, under Serial No. 420,548.

I claim:—

1. The combination in an open rectangular chain link, of side bars; each having a hook at one end and each being provided with a laterally extending shoulder adjacent its hook; with a socket member mounted between the hooks and having extensions resting against the shoulders.

2. An open rectangular chain link having an end bar and side bars; each side bar having a hook at one end and a laterally extending shoulder back of the hook; the side bars at the hooks being closer than at the end bar; a socket member secured to the side bars and mounted between the hooks; the rear portion of said member having lateral extensions bearing against the shoulders.

3. The combination in an open rectangular chain link, of a cross bar of circular section and rectangular side bars; each side bar having a hook at one end and being provided with a laterally extending shoulder directly back of the hook; the hooked ends of the side bars being closer together than the other ends thereof; with a socket member mounted between the hooked ends of the side bars and having lateral extensions resting against the shoulders; said socket member being secured to said side bars.

4. The combination in an open rectangular chain link of an end bar; two side bars each having a hook at one end and connected to the end bar; with a hooked socket member mounted between the hooks of the side bar; the internal surfaces of the hooks of the socket member and of the side bars alining with each other.

5. The combination in a chain link of two side bars; means for connecting said bars, the ends of the side bars being hooked; with a hooked socket member mounted between said side bars and provided with a lateral extension engaging the same; the hooks of the socket member and side bars being in line with each other and forming a substantially continuous working surface.

6. The combination in a chain link, of a quadrangular body portion made of wire bent into shape and also bent to form shoulders and a hook member, and a socket section adapted to rest between the sides of the hook member and having lateral extensions resting against the shoulders at the junction of the hook member and the body of the link.

In testimony whereof, I have signed my name to this specification, in the presence of two subscribing witnesses.

JAMES M. DODGE.

Witnesses:
Jos. H. Klein,
Wm. A. Barr.